United States Patent
Emelyanov et al.

(10) Patent No.: US 11,016,684 B1
(45) Date of Patent: May 25, 2021

(54) SYSTEM AND METHOD FOR MANAGING DATA AND METADATA WHERE RESPECTIVE BACKING BLOCK DEVICES ARE ACCESSED BASED ON WHETHER REQUEST INDICATOR INDICATES THE DATA OR THE METADATA AND ACCESSING THE BACKING BLOCK DEVICES WITHOUT FILE SYSTEM WHEN THE REQUEST INDICATOR IS NOT INCLUDED IN REQUEST

(71) Applicant: Virtuozzo International GmbH, Schaffhausen (CH)

(72) Inventors: Pavel Emelyanov, Moscow (RU);
Dmitry Monakhov, Moscow (RU);
Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 48 days.

(21) Appl. No.: 16/235,430

(22) Filed: Dec. 28, 2018

(51) Int. Cl.
*G06F 3/06* (2006.01)

(52) U.S. Cl.
CPC ............ *G06F 3/064* (2013.01); *G06F 3/0611* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 6,134,619 A | * | 10/2000 | Futral | G06F 13/4059 710/112 |
| 2010/0169570 A1 | * | 7/2010 | Mesnier | G06F 3/0644 711/114 |
| 2011/0196848 A1 | * | 8/2011 | Anglin | G06F 16/113 707/692 |
| 2012/0290786 A1 | * | 11/2012 | Mesnier | G06F 12/0875 711/113 |
| 2017/0124337 A1 | * | 5/2017 | Li | G06F 21/62 |

* cited by examiner

*Primary Examiner* — Reginald G Bragdon
*Assistant Examiner* — Chie Yew
(74) *Attorney, Agent, or Firm* — Arent Fox LLP; Michael Fainberg

(57) ABSTRACT

Disclosed herein are systems and method for managing blocks of data and metadata. In one aspect, an exemplary method comprises, receiving, by a virtual block device (VBD), a request from a file system, wherein the request includes one or more of: a type of operation requested by the file system, including one of a read operation or a write operation, and/or an indication as to whether the request is for a block of data or a metadata of the file system, when the request includes the indication as to whether the received request is for a block of data or a metadata, selecting, based on the indication, one of two or more separate storage locations associated with the requested block of data or a metadata respectively, and accessing the determined storage location to perform the requested operation on the block of data or the metadata in the storage location.

21 Claims, 9 Drawing Sheets

SYSTEM AND METHOD FOR MANAGING DATA AND METADATA WHERE RESPECTIVE BACKING BLOCK DEVICES ARE ACCESSED BASED ON WHETHER REQUEST INDICATOR INDICATES THE DATA OR THE METADATA AND ACCESSING THE BACKING BLOCK DEVICES WITHOUT FILE SYSTEM WHEN THE REQUEST INDICATOR IS NOT INCLUDED IN REQUEST

TECHNICAL FIELD

The present disclosure generally relates to computer data management, and, more particularly, to a file system and method for managing blocks of data and metadata.

BACKGROUND

In modern computer systems, data management includes storing data on disks, retrieving and processing the data, when needed. The file system typically stores blocks of data and the associated metadata in the same place, e.g., same storage disks. However, operations of a file system on metadata typically result in random I/O operations on the underlying block device. In contrast, operations of the file system on blocks of data are likely to be sequential. Moreover, when a block of data is written, typically it is appended to the end of a file. In contrast, the metadata is subject to being over-written. As such, a disk that can handle sequential I/Os may serve the blocks of data well, while being too slow for serving metadata. Handling both data and metadata the same way leads to inefficiency.

Hence, there is a need for an improvement in managing of blocks of data and metadata.

SUMMARY

Accordingly, a system and method is provided to efficiently manage blocks of data and metadata. In one aspect, the system comprises a file system (e.g., a software stack containing the file system), a virtual block device and two or more separate storage locations, with each storage location being associated with either blocks of data or metadata. The virtual block device (VBD) of the present disclosure comprises a block device that splits and writes blocks of data and metadata received from the file system into separate storage locations.

In one aspect, the method comprises receiving, by a virtual block device (VBD), a request from a file system, wherein the request includes one or more of: a type of operation requested by the file system, including one of a read operation or a write operation, and/or an indication as to whether the request is for a block of data or a metadata of the file system, when the request includes the indication as to whether the received request is for a block of data or a metadata, selecting, by the VBD, based on the indication, one of two or more separate storage locations associated with the requested block of data or a metadata respectively; and accessing, by the VBD, the determined storage location to perform the requested operation on the block of data or the metadata of the file system in the storage location.

In one aspect, the metadata is stored in a Solid State Drive (SSD) or a Random Access Memory (RAM).

In one aspect, the blocks of data are stored in a Hard Disk Drive (HDD) or a Shingled Magnetic Recording (SMR).

In one aspect, the method further comprises: sending the blocks of data to a data processing module, the data processing module analyzing and processing the blocks of data, and storing the processed blocks of data in the data storage.

In one aspect, the data processing comprises the processing of the blocks of data including at least one of: caching data, checking data, pattern-checking, de-duplicating data, compressing data, encrypting/decrypting data.

In one aspect, the de-duplicating includes: storing metadata about the blocks of data that are being processed in the metadata storage, or storing metadata about the blocks of data that are being processed in a storage location separate from the metadata storage (e.g., another block device, on a different disk partition, on another SSD disk, etc.).

In one aspect, the performing, by the VBD, the requested operation of the metadata further includes: sending, by the VBD, metadata to a metadata processing module, the metadata processing module analyzing and processing the metadata, and storing the processed metadata in the metadata storage.

In one aspect, the processing of the metadata includes at least one of: caching data, checking data, pattern-checking, de-duplicating data, compressing data, encrypting/decrypting data. In one aspect, the caching of the metadata may be performed using a RAM or a separate but faster SSD.

In one aspect, the indication as to whether the request is for the block of data or the metadata is included in a bit in a predetermined place of the request.

In one aspect, the VBD performs a writing of the blocks of data and metadata, separately, via two or more backing block devices, wherein a first backing block device is registered for data storage and a second backing block device is registered for metadata storage.

In one aspect, a storage location of the one or more storage locations comprises the VBD, wherein the VBD comprises a processing module, and the processing module performs one of: do nothing, caching, encrypting, decrypting, checking, de-duplicating, compressing, pattern-checking.

In one aspect, the present disclosure describes a system for managing metadata and data, the system comprising an operating system that includes a file system, memory devices, a virtual block device (VBD), and at least one processor associated with the VBD, the processor configured to: receive a request from the file system, wherein the request includes one or more of: a type of operation requested by the file system, including one of a read operation or a write operation, and/or an indication as to whether the request is for a block of data or a metadata of the file system, when the request includes the indication as to whether the received request is for a block of data or a metadata, select based on the indication, one of two or more separate storage locations associated with the requested block of data or a metadata respectively, and access the determined storage location to perform the requested operation on the block of data or the metadata of the file system in the storage location.

In one aspect, the present disclosure describes a non-transitory computer readable medium storing thereon computer executable instructions for managing metadata and blocks of data, including instructions for: receiving a request from a file system, wherein the request includes one or more of: a type of operation requested by the file system, including one of a read operation or a write operation, and/or an indication as to whether the request is for a block of data or a metadata of the file system, when the request includes the indication as to whether the received request is for a block of data or a metadata, selecting based on the indication, one of two or more separate storage locations associated with the requested block of data or a metadata respectively, and accessing the determined storage location to perform the requested operation on the block of data or the metadata of the file system in the storage location.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
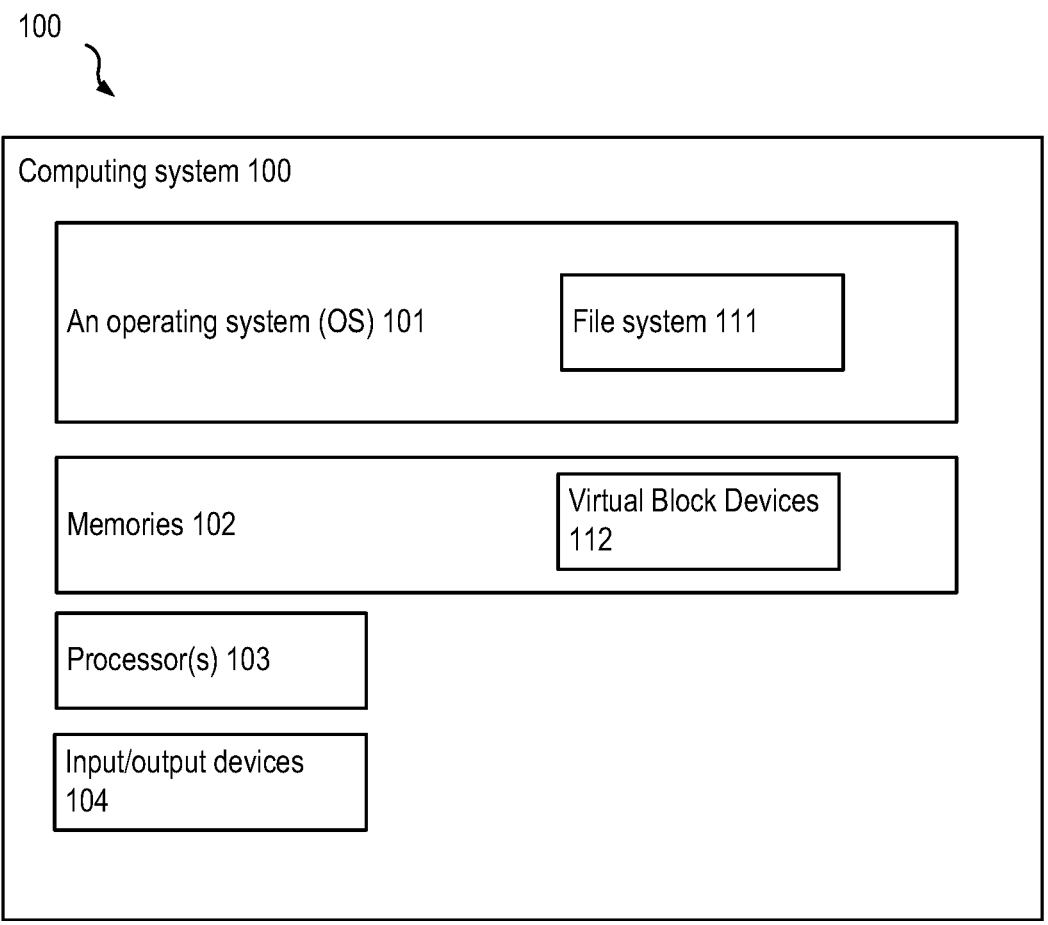
FIG. 1 illustrates a block diagram of a system for managing data and metadata according to an exemplary aspect.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

As described above, the present disclosure describes a system and method that manage blocks of data (e.g., those data that OS, user or an application put on a file system) and file system metadata in an efficient manner. In one aspect, the system comprises a file system (e.g., a software stack containing the file system), a virtual block device and two or more separate storage locations, with each storage location being associated with either blocks of data or metadata, but not both. The virtual block device (VBD) of the present disclosure comprises a block device that splits and writes blocks of data and metadata received from the file system into separate storage locations. In one aspect, the file system is mounted above the virtual block device.

In one aspect, the VBD receives I/O requests from the file system along with an indication as to whether the request is for a block of data or for metadata. In turn, the VBD processes the received request based on the indication.

In one aspect, a bit in a predetermined place of the request is used to provide the indication as to whether the request is for the block of data or for the metadata.

In one aspect, the file system comprises a special file system used for managing blocks of data and metadata in accordance with the teachings of the present disclosure. In another aspect, the file system comprises a standard file system that is patched to provide the functionality of the present disclosure to split management of blocks of data and metadata. For example, the patching of the file system may be to mark I/O requests sent to a lower level (i.e., the virtual block device) with a flag that denotes whether the request is for metadata or for blocks of data.

In one aspect, the two or more separate storage locations may include different storage devices or different partitions of a same storage device. For example, the VBD may comprise a splitting block device that serves as a device mapper that has two or more other block devices registered in it as "backing" block devices. At least one of the backing block devices may be registered for metadata storage and at least one of the other backing block devices (i.e., one of the ones not registered for metadata storage) may be registered for data storage. In other words, a particular backing block device is registered for either for metadata storage or data storage. For ease of reference, the backing block device registered for metadata storage may be referred to as "metadata bdev" and the backing block device registered for data storage may be referred to as "data bdev". Thus, when an I/O request is received by the VBD from a file system, the requests marked as "metadata" are forwarded to the metadata bdev, and the requests marked as "data" are forwarded to the data bdev.

In one aspect, I/O requests may not include the flag for denoting whether the request is for metadata or for blocks of data. For example, virtual block device may also provide raw access. During raw access, the metadata/data bit on the requests is not provided. Raw access can be performed without using the file system, for example by an OS. Thus, the VBD of the present disclosure also stores key:value pairs that are used for maintaining a mapping from the offset included in the I/O request to an address on the backing block device (data bdev or metadata bdev, or even other block device specially dedicated for raw access requests, or to which the very first write is performed). For example, a VBD 212 of FIG. 2 may store a key:value 234 that is used for maintaining a mapping from the offset included in the I/O request to a location on the backing block device. Based on the type of operation to be performed (write or read), the offset for determining the location comprises: a number of the storage block to which the respective block of data or metadata should be written, or a number of the storage block from which the respective block of data or metadata should be read.

FIG. 1 illustrates a block diagram of a system 100 for managing data and metadata according to an exemplary aspect. In general, the exemplary system can be implemented on any type of computing system 100 (e.g., a personal computer, laptop, server, etc.) that includes a computer processing unit ("CPU") and electronic memory that includes software for executing the management of data and metadata disclosed herein. Details of an exemplary computer system on which computing system 100 can be provided are described below with respect to FIG. 9.

The computing system 100 includes: an operating system (OS) 101, memory (memories) 102, processor(s) 103, input/output devices 104, etc. The OS 101 comprises a file system 111 used to read and write to disk clusters, manage folders and directories, provide an index of files, define paths to files, provide file naming conventions, etc. The memories 102 include virtual block devices 112 which are used for storing chunks of data/metadata that are called "blocks" (e.g., providing access to the chunks of data/metadata that are storing on some physical block device). For example, a physical block device may be a hard disk, a floppy drive, Blu-ray reader, a flash memory, etc.

Figure 2:
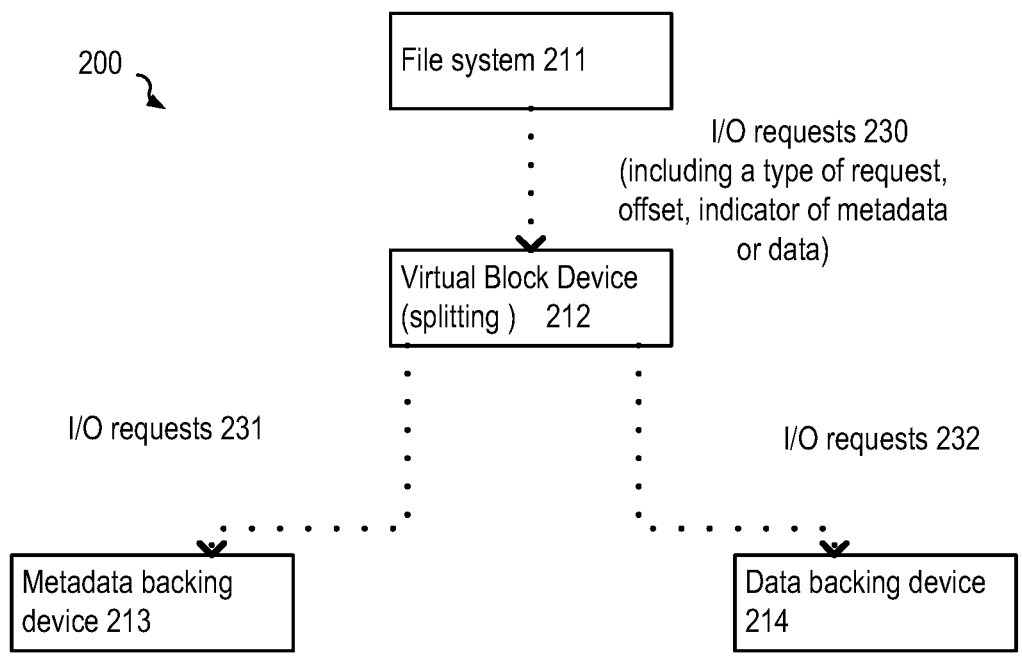
FIG. 2 illustrates an exemplary system for managing metadata and data in accordance with the present disclosure.

FIG. 2 illustrates an exemplary system 200 for managing metadata and data in accordance with the present disclosure. The system 200 includes a file system 211, a virtual block device 212, a metadata backing device (metadata bdev) 213, and a data backing device (data bdev) 214. The file system 211 sends the I/O requests 230 to the virtual block device 212. In one aspect, the I/O request include a type of request, e.g., a write or a read, and a marker indicating whether the request is for metadata or for a block of data. In one aspect, the I/O request further includes an offset, e.g., a block number to which the data/metadata should be written to or from which the data/metadata should be read.

The virtual block device 212 splits the I/O requests for metadata from the I/O requests for blocks of data. In other words, the virtual block device 212 is a splitting block device (or a device mapper). The I/O requests 231 are marked as metadata and the I/O requests 232 are marked as blocks of data. Thus, The I/O requests 230 are split into two streams of I/O requests 231 and 232. The I/O requests 231 are sent to the metadata bdev 213 and the I/O requests 232 are sent to the data bdev 214.

As described above, one of the goals of the present disclosure is to improve the management of file system metadata and data—thereby improving efficiency in reading and writing operations. As mentioned above, operations on metadata typically result in random I/O on the underlying block device while operation on blocks of data typically involve sequential operations. In addition, a block of data is typically appended at the end of a file, while metadata is typically written over prior record (i.e., prior record is overwritten). As such, different kinds of disks may be appropriate for metadata and data. For example, Hard Disk Drives (HDDs) are relatively cheaper than Solid State Drives (SSDs). However, the spinning nature of HDDs makes them more suitable for sequential I/O operations than for random I/O operations. Thus, HDDs are efficient enough for storing and retrieving blocks of data but not for storing and retrieving metadata. In another example, Shingled Magnetic Recordings (SMRs) are known to have one of the best per-megabyte costs. However, SMRs work well only for append-only operations. Overwrites using SMRs are too slow for most applications. In another example, a Random Access Memory (RAM) is used for metadata for fast access by the CPU. For example, the intensive nature of the operations for metadata may be served by a RAM. Therefore, a disk may be assigned for metadata or data based on the suitability of a type of disk, the cost, and the speed in performing I/O operations.

In one aspect of the present disclosure, an SSD or a RAM is used for storing metadata. In another aspect, an HDD or SMR is used for storing blocks of data.

Figure 3:
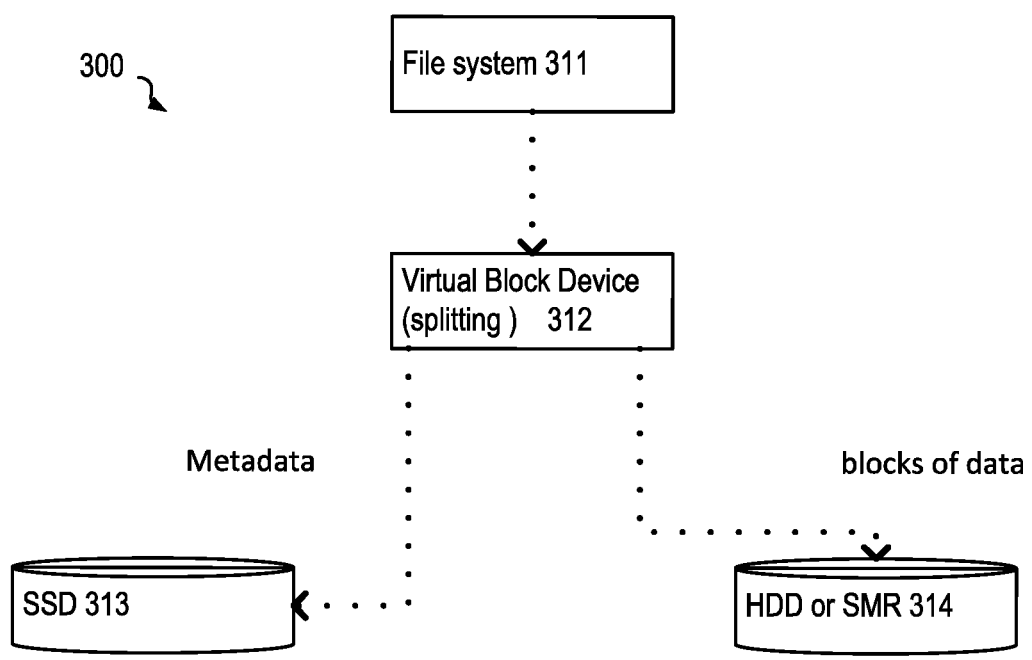
FIG. 3 illustrates an exemplary system for managing metadata and data using a hybrid disk in accordance with the present disclosure.

FIG. 3 illustrates an exemplary system 300 for managing metadata and data using a hybrid disk in accordance with the present disclosure. The system 300 includes a file system 311, a virtual block device 312, an SSD 313 serving as a metadata backing device, and an HDD or SMR 314 serving as a data backing device. In other words, the "hybrid disk" refers to a combination of one SSD with one HDD/SMR— the SSD being used for the metadata and the HDD/SMR being used for the blocks of data. The intensive metadata I/O and the sequential data I/O are served in accordance to their respective needs. Moreover, replacing the HDD by the SMR for the blocks of data provides a hybrid disk at a lower cost per-megabyte of storage.

In one aspect, instead of storing the blocks of metadata and blocks of data directly, the VBD sends the data to a data processing module and the metadata to a metadata processing module.

In one aspect, the data processing module analyzes and processes the blocks of data and stores the processed blocks of data in the respective data storage (i.e., in the data bdev). In one aspect, the data processing module comprises a pattern-checking block device, the processing of the blocks of data including at least one of: checking patterns, de-duplicating data, and encrypting/decrypting.

In one aspect, the de-duplicating of the data includes: searching for blocks of data that contain same data, e.g., using checksums or hashes, and storing metadata about the blocks of data that are being processed in the metadata storage, or storing metadata about the blocks of data that are being processed in a storage location separate from the metadata storage (e.g., another block device, on a different disk partition, on another SSD disk, etc.).

In one aspect, the metadata processing module analyzes and processes the metadata, and stores the processed metadata in the metadata storage, e.g., the metadata bdev. In one amaspect, the processing of the metadata by the metadata processing module includes at least one of: caching the metadata, checking, and encrypting the metadata.

The caching of data or metadata includes using two underlying devices, e.g., memory or block devices. One device is used for storing the data or metadata and the other device is used to store cached portions of the data or metadata. It is noted that block caching methods may cache I/O requests sent to an HDD by storing the blocks of data on a smaller SSD. Regardless of the method, it is better to give more cache resources to metadata rather than to blocks of data. However, while operating on the SSDs, the requests for metadata and regular blocks of data are not distinguished. Thus, bulk access for blocks of data may fill the cache and push metadata to other slower storage spaces. Effectively, the performance of the system is reduced. The present disclosure addresses this shortcoming by enabling the cache device to receive only I/O requests for metadata.

In one aspect, the caching of the metadata is performed via a caching module included in the metadata processing module. For example, the caching module may be a RAM included in the metadata processing module. In another aspect, the caching is performed in a separate SSD, e.g., a separate but faster SSD.

Figure 4:
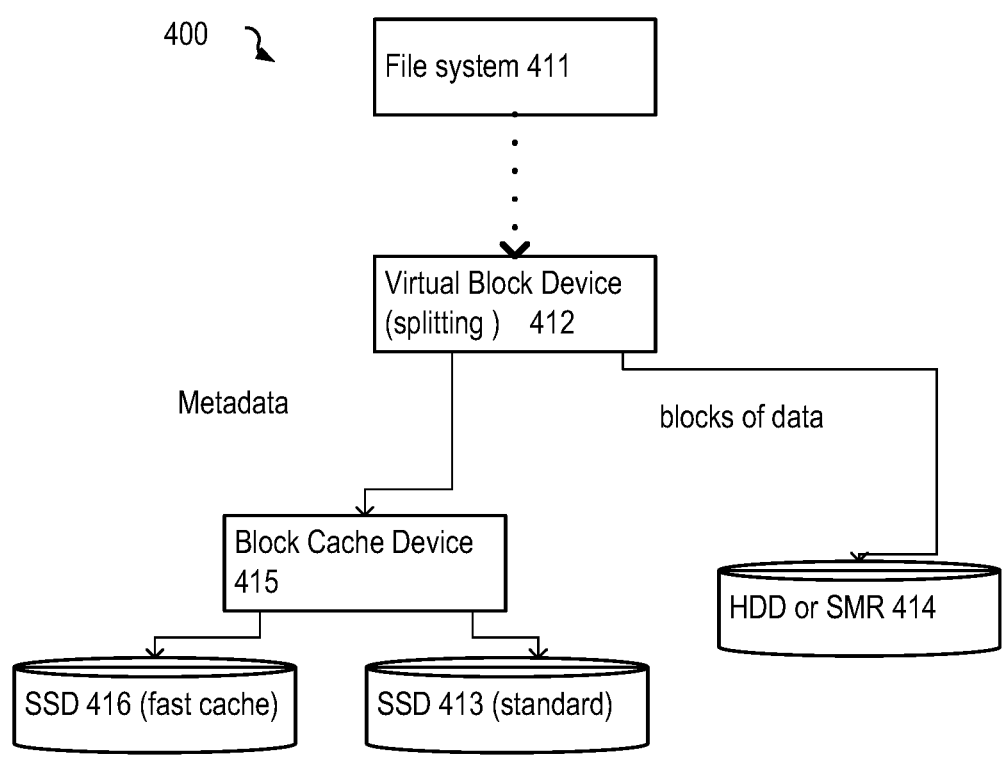
FIG. 4 illustrates an exemplary system for managing metadata and data using a caching device for metadata in accordance with the present disclosure.

FIG. 4 illustrates an exemplary system 400 for managing metadata and data using a caching device for metadata in accordance with the present disclosure. The system 400 includes a file system 411, a virtual block device 412, a standard SSD or HDD 413, and an HDD or SSD 414 serving as a data backing device, a block cache device 415 for processing metadata, and a faster SSD 416 for writing metadata with intensive I/O operations. In one aspect, the blocks of data and metadata are stored on a same block device, the device being an HDD, SMR, SSD, and the like. As shown in FIG. 4, the standard SSDs 413 and the faster SSD 416 are used only for metadata. In other words, only the I/O requests directed to the block cache device 415 reach the SSDs 413 and 416. In contrast, the blocks of data are stored in the HDD 414.

Figure 5:
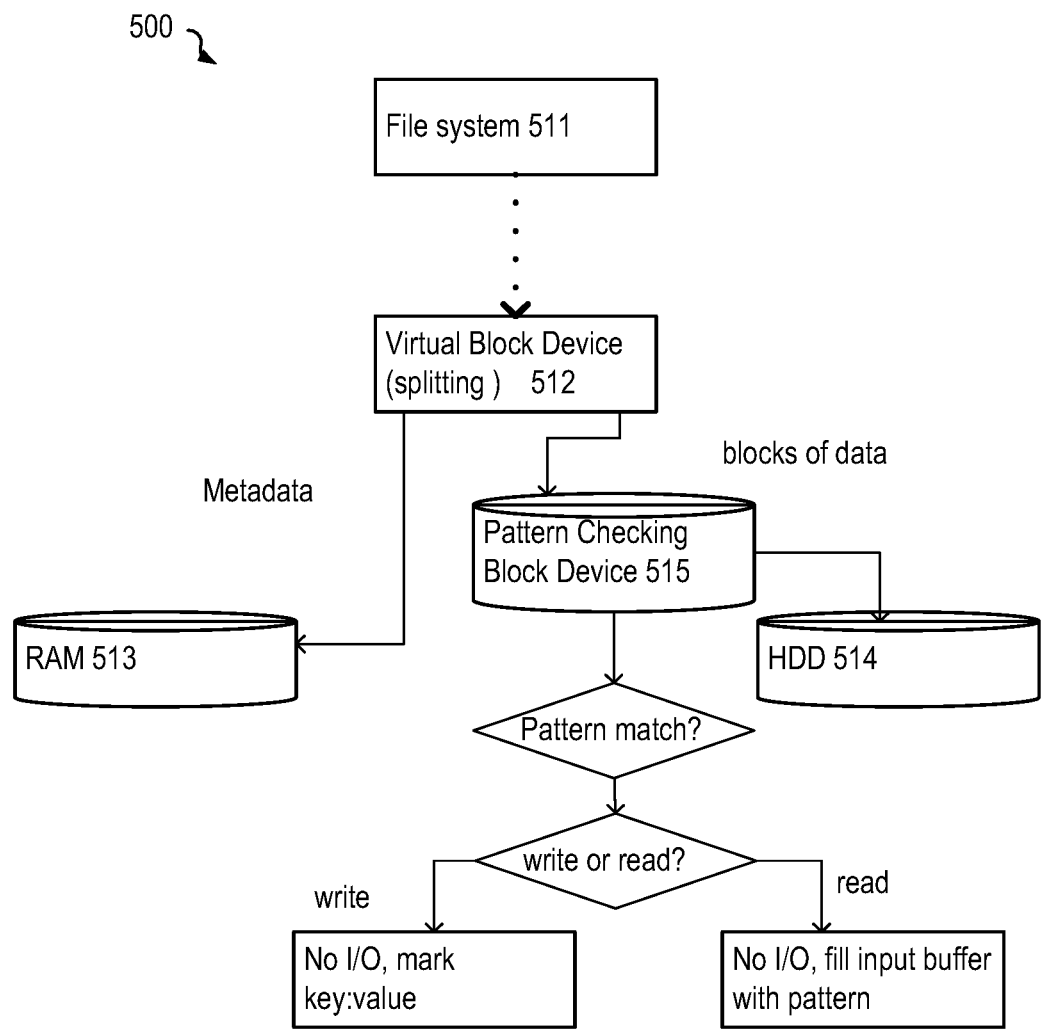
FIG. 5 illustrates an exemplary system with a data processing module that includes the pattern checking block device in accordance with the present disclosure.

Returning to the data processing module, the data processing module may comprise a pattern-checking block device. It is noted that pattern does not perform I/O operations to underlying block devices. FIG. 5 illustrates an exemplary system 500 with a data processing module that includes the pattern checking block device in accordance with the present disclosure. The system 500 includes a file system 511, a virtual block device 512, a RAM 513 for storing metadata, a pattern checking block device 515, and an HDD 514. In one aspect, the pattern checking block device 515 checks the pattern of blocks of data received from the VBD 512. If pattern is found, no I/O operation is performed. If the request is for a read operation, the input buffer is filled with the pattern. If the pattern match is not found, the block of data is stored in the HDD 514.

The system 500 is suitable for testing. When testing for a performance and robustness of a file system, the test engineers may not care about a type of data being written into files. The test engineers may only care about the correctness of the metadata and about data not being corrupted. The testing may be performed in one of two approaches. The first approach is to test with small amount of data at a high speed by using RAM disks. The second approach is to test with a large amount of data using lower performance disks. Using the VBD of the present disclosure improves the testing when the data contains some pre-defined periodic pattern. Any short pattern appropriate for a testing mode, e.g., 0XABAB . . . AB, may be used. The testing data then contains the pre-defined periodic pattern. When writing, the block of data is examined to determine when it contains the pre-defined pattern. If the pre-defined pattern is included, no I/O is performed. When reading, the missing blocks of data fill the input buffer with the pre-defined pattern.

Figure 6:
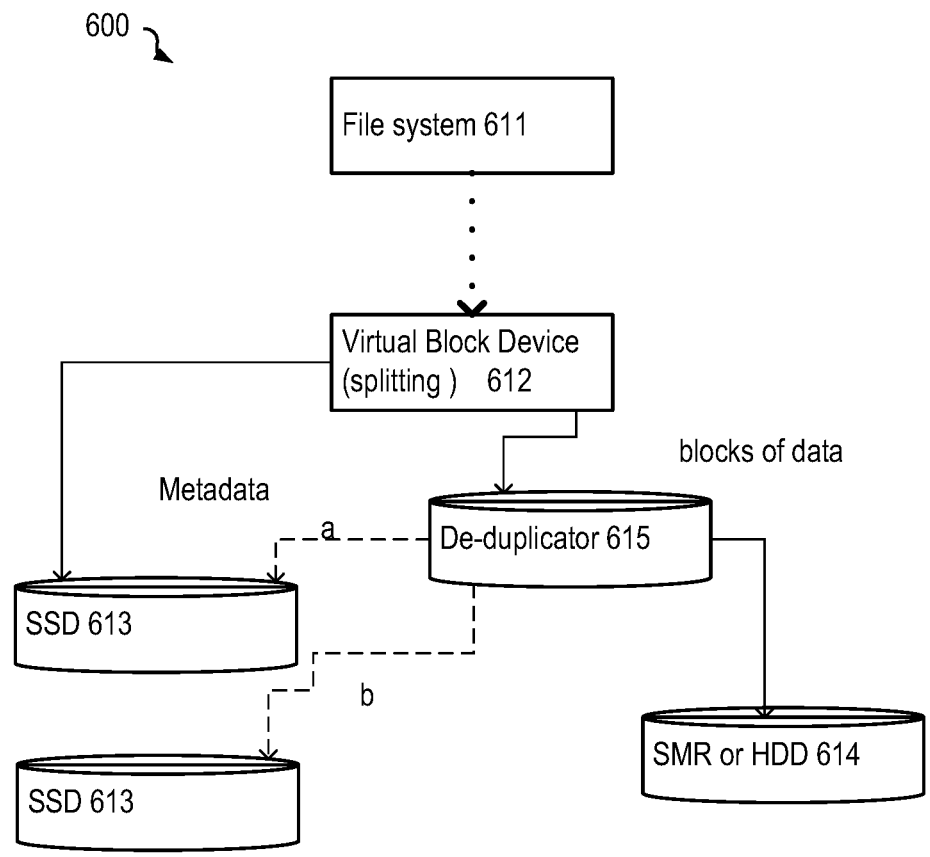
FIG. 6 illustrates an exemplary system with a data processing module that includes a de-duplicator of data in accordance with the present disclosure.

As described above, the processing of the blocks of data may further include de-duplicating data. FIG. 6 illustrates an exemplary system 600 with a data processing module that includes a de-duplicator of data in accordance with the present disclosure. The system 600 includes a file system 611, a virtual block device 612, an SSD 613a, an SSD 613b, a de-duplicator 615, and an SMR or HDD 614. In one aspect, the de-duplicator 615 stores metadata (the metadata of the processing module, e.g., de-duplicator) about the blocks of data that are being processed in the metadata storages 613a (i.e., in the same storage where the file system metadata is stored) or 613b (in another storage). The de-duplicator 615 also stores the de-duplicated data in the SMR or HDD 614.

Figure 7:
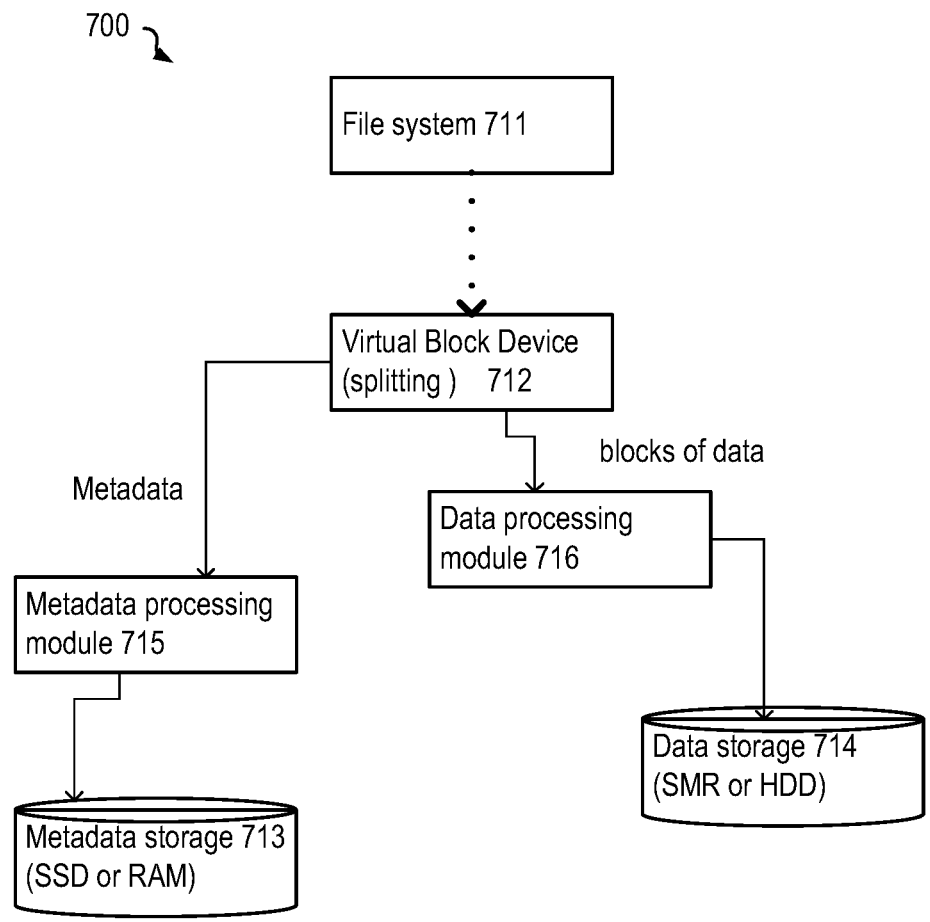
FIG. 7 illustrates an exemplary system with a data processing module that includes analysis of blocks of data and a metadata processing module with caching in accordance with the present disclosure.

FIG. 7 illustrates an exemplary system 700 with a data processing module that includes analysis of blocks of data and a metadata processing module with caching in accordance with the present disclosure. The system 700 includes a file system 711, a virtual block device 712, a metadata processing module 715, a data processing module 716, a metadata storage 713, and a data storage 714. The metadata storage 713 may comprise a RAM, SSD, faster SSD or HDD, and the data storage 714 may comprise an SSD, HDD or SMR.

In one aspect, any device or combination of devices may be used for storing the data and metadata. In another aspect, the metadata and data backing block devices may be on different partitions of a same block device.

The metadata processing module 715 and the data processing module 716 are the optional features. The data processing module 716 may include at least one of: a caching device, a check device, a pattern-checking block device (e.g., FIG. 5, item 515), the de-duplicator (e.g., FIG. 6, item 615), a compression device, or an encrypting and/or decrypting device. Similarly, the metadata processing module 715 may comprise at least one of: the block cache device described above, e.g., FIG. 4, item 415, an encrypting and/or decrypting device or a check device.

In one aspect, the storage location comprises a virtual block device, wherein the virtual block device comprises an optional processing module. In one aspect, the optional processing module performs one of: caching, encrypting and/or decrypting, checking, de-duplicating, compressing, pattern-checking. In other words, the data or metadata processing module performs on the respective data or metadata the caching, encrypting and/or decrypting, checking, de-duplicating, compressing, pattern-checking.

The encryption/decryption via the processing module includes: encrypting the data or metadata before placing on the underlying block device, and when there is a read request for the data or metadata, decrypting and sending the data or metadata as a response to the read request.

The compression of data or metadata includes compressing the data or metadata before placing on the underlying block device, when there is a read request for the data or metadata, decompressing and sending the data or metadata as a response to the read request. The compression can be used when a size of data blocks, with which the file system works, is bigger than the size of blocks on the block device. In such cases, the compression can improve I/O performance greatly.

The checking for data or metadata includes computing checksums of parts of data or metadata (e.g., on blocks on the underlying block device), storing the checksums (e.g., on a same or another block device, in memory, etc.), and checking. For example, the checksum can be computed when writing on the block device and checked when reading from the block device. If, on the read request, a newly computed checksum is not equal to the stored checksum, then the error is sent in response to the read request.

In addition, in case of metadata, usually metadata has links (pointers/stores addresses) to corresponding data blocks. Therefore, the checking may include determining whether such links point to real data, e.g., by checking whether an address of a data block is out of range of the blocks of the block devices. If the checking module finds an error, then the indication about the error is sent to the file system.

Figure 8:
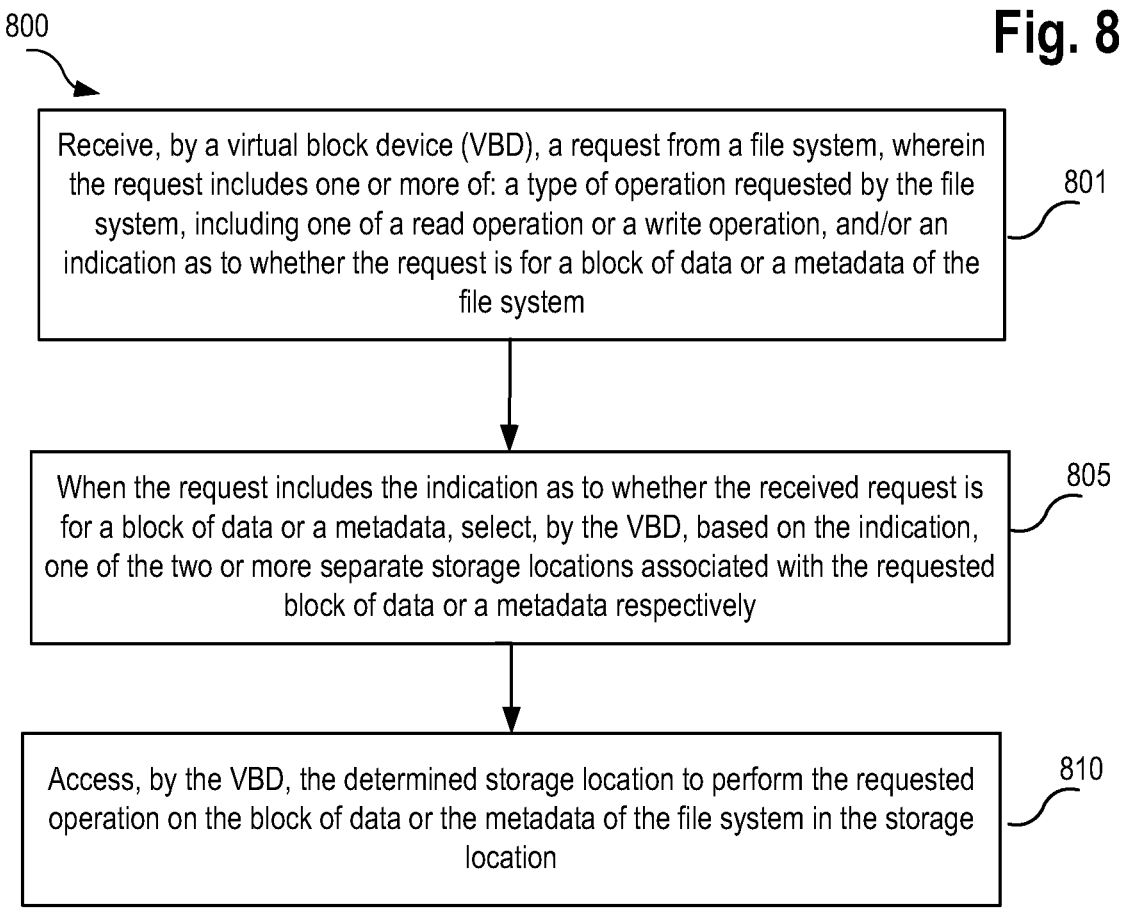
FIG. 8 illustrates a flowchart of a method for managing metadata and data in accordance with exemplary aspects of the present disclosure.

FIG. 8 illustrates a flowchart 800 of a method for managing file system metadata and data in accordance with exemplary aspects of the present disclosure. The method of FIG. 8 may be carried out with the aid of the system described in FIGS. 1-7.

In step 801, the method receives, by a virtual block device (VBD), a request from a file system, wherein the request includes one or more of: a type of operation requested by the file system, including one of a read operation or a write operation, and/or an indication as to whether the request is for a block of data or a metadata of the file system.

In step 805, when the request includes the indication as to whether the received request is for a block of data or a metadata, the method selects, by the VBD, based on the indication, one of the two or more separate storage locations associated with the requested block of data or a metadata respectively.

In step 810, the method accesses, by the VBD, the determined storage location to perform the requested operation on the block of data or the metadata of the file system in the storage location.

Figure 9:
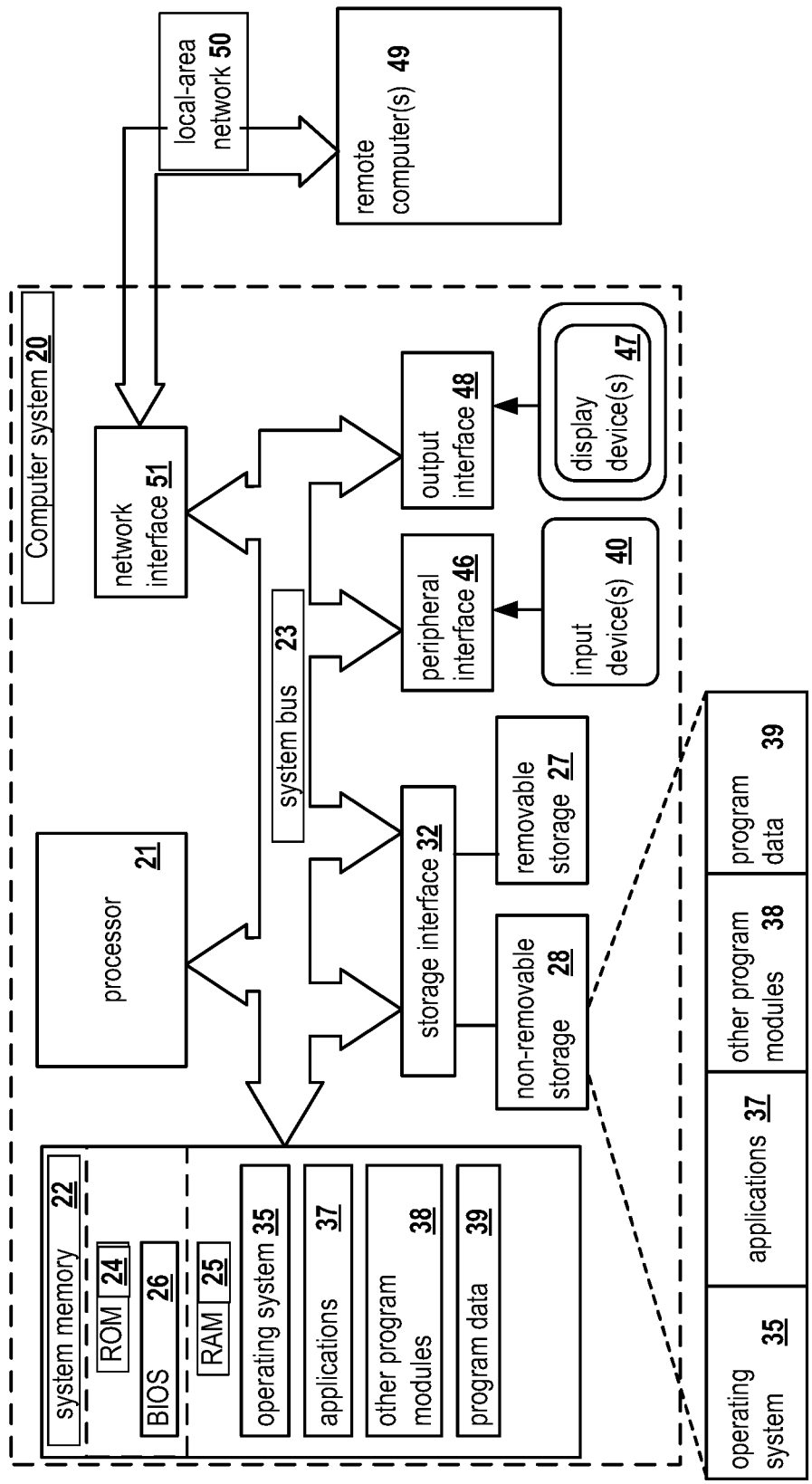
FIG. 9 is a block diagram illustrating a general-purpose computer system 20 on which aspects of the present disclosure may be implemented in accordance with an exemplary aspect.

FIG. 9 is a block diagram illustrating a computer system 20 on which aspects of systems and methods for managing a file system metadata and data in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 9, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for managing blocks of data and metadata, comprising:
    receiving, by a virtual block device (VBD) on a computing device, a request from a file system, wherein the request includes one or more of: a type of operation requested by the file system or an indication as to whether the request is for a block of data or a metadata of the file system, wherein the type of operation includes a read operation or a write operation;
    wherein the VBD has two or more separate backing block devices, at least one of the two or more separate backing block devices is dedicated to storing metadata and at least another one of the two or more backing block devices is dedicated to storing a block of data;
    in response to the request including the indication that the request is for the block of data, selecting and accessing, by the VBD, the at least one of the two or more separate backing block devices to perform the requested operation on the block of data;
    in response to the request including the indication that the request is for the metadata, selecting and accessing, by the VBD, the at least another one of the two or more backing click devices to perform the requested operation on the metadata of the file system;
    and in response to the request not including the indication, providing, by the VBD, raw access to at least one of the two or more separate backing block devices, wherein the raw access is performed without using the file system.

2. The method of claim 1, wherein the at least one of the two or more separate backing block devices dedicated to storing the metadata is a Solid State Drive (SSD) or a Random Access Memory (RAM).

3. The method of claim 1, wherein the at least another one of the two or more separate backing block devices dedicated to storing the block of data is a Hard Disk Drive (HDD) or a Shingled Magnetic Recording (SMR).

4. The method of claim 1, further comprising:
sending the block of data to a data processing module configured for analyzing and processing the block of data, and storing the processed block of data in the at least another one of the two or more separate backing block devices dedicated to storing the block of data.

5. The method of claim 4, wherein performing the requested operation further comprises processing of the block of data by at least one of: caching the block of data, checking the block of data, pattern-checking, de-duplicating the block of data, compressing the block of data, encrypting/decrypting the block of data.

6. The method of claim 5, wherein the de-duplicating includes:
storing metadata about the block of data that is being processed in the at least one of the two or more separate backing block devices dedicated to storing the metadata;
or storing the metadata of the block of data that is being processed in a different backing block device instead of the at least one of the two or more separate backing block devices dedicated to storing the metadata.

7. The method of claim 1, wherein the performing, by the VBD, the requested operation on the metadata further includes:
sending, by the VBD, the metadata to a metadata processing module, the metadata processing module configured for analyzing and processing the metadata, and storing the processed metadata in the at least one of the two or more separate backing block devices dedicated to storing the metadata.

8. The method of claim 7, wherein performing the requested operation on the metadata further comprises processing the metadata by at least one of: caching the metadata, encrypting/decrypting the metadata, and checking the metadata.

9. The method of claim 1, wherein the indication as to whether the request is for the block of data or the metadata is included in a bit in a predetermined place of the request.

10. The method of claim 1, wherein a backing block device of the two or more separate backing block devices further performs one of: caching, encrypting, decrypting, checking, de-duplicating, compressing, pattern-checking.

11. A system for managing metadata and data, the system comprising a file system, a virtual block device (VBD), and at least one processor configured to:
receive, by a virtual block device (VBD) on a computing device, a request from a file system, wherein the request includes one or more of: a type of operation requested by the file system or an indication as to whether the request is for a block of data or a metadata of the file system, wherein the type of operation includes a read operation or a write operation;
wherein the VBD has two or more separate backing block devices, at least one of the two or more separate backing block devices is dedicated to storing metadata and at least another one of the two or more backing block devices is dedicated to storing a block of data;
in response to the request including the indication that the request is for the block of data, selecting and accessing, by the VBD, the at least one of the two or more separate backing block devices to perform the requested operation on the block of data;
in response to the request including the indication that the request is for the metadata, selecting and accessing, by the VBD, the at least another one of the two or more backing click devices to perform the requested operation on the metadata of the file system;
and in response to the request not including the indication, providing, by the VBD, raw access to at least one of the two or more separate backing block devices, wherein the raw access is performed without using the file system.

12. The system of claim 11, wherein the at least one of the two or more separate backing block devices dedicated to storing the metadata is a Solid State Drive (SSD) or a Random Access Memory (RAM).

13. The system of claim 11, wherein the at least another one of the two or more separate backing block devices dedicated to storing the block of data is a Hard Disk Drive (HDD) or a Shingled Magnetic Recording (SMR).

14. The system of claim 11, the processor further being configured to:
send the block of data to a data processing module configured for analyzing and processing the block of data, and store the processed block of data in the at least another one of the two or more separate backing block devices dedicated to storing the block of data.

15. The system of claim 14, wherein performing the requested operation further comprises processing of the block of data by at least one of: caching the block of data, checking the block of data, pattern-checking, de-duplicating the block of data, compressing the block of data, encrypting/decrypting the block of data.

16. The system of claim 15, wherein the de-duplicating includes:
storing metadata about the block of data that is being processed in the at least one of the two or more separate backing block devices dedicated to storing the metadata;
or storing the metadata of the block of data that is being processed in a different backing block device instead of the at least one of the two or more separate backing block devices dedicated to storing the metadata.

17. The system of claim 11, wherein the processor being configured to perform the requested operation on the metadata further includes the processor being configured to:
send, by the VBD, the metadata to a metadata processing module, the metadata processing module configured for analyzing and processing the metadata, and store the processed metadata in the at least one of the two or more separate backing block devices dedicated to storing the metadata.

18. The system of claim 17, wherein performing the requested operation on the metadata further comprises processing the metadata by at least one of: caching the metadata, encrypting/decrypting the metadata, and checking the metadata.

19. The system of claim 11, wherein the indication as to whether the request is for the block of data or the metadata is included in a bit in a predetermined place of the request.

20. The system of claim 11, wherein a backing block device of the two or more separate backing block devices further performs one of: caching, encrypting, decrypting, checking, de-duplicating, compressing, pattern-checking.

21. A non-transitory computer readable medium storing thereon computer executable instructions for managing metadata and blocks of data, including instructions for:
receiving, by a virtual block device (VBD) on a computing device, a request from a file system, wherein the request includes one or more of: a type of operation requested by the file system or an indication as to whether the request is for a block of data or a metadata of the file system, wherein the type of operation includes a read operation or a write operation;

wherein the VBD has two or more separate backing block devices, at least one of the two or more separate backing block devices is dedicated to storing metadata and at least another one of the two or more backing block devices is dedicated to storing a block of data;

in response to the request including the indication that the request is for the block of data, selecting and accessing, by the VBD, the at least one of the two or more separate backing block devices to perform the requested operation on the block of data;

in response to the request including the indication that the request is for the metadata, selecting and accessing, by the VBD, the at least another one of the two or more backing click devices to perform the requested operation on the metadata of the file system;

and in response to the request not including the indication, providing, by the VBD, raw access to at least one of the two or more separate backing block devices, wherein the raw access is performed without using the file system.

\* \* \* \* \*